(12) United States Patent
Hodge

(10) Patent No.: US 9,784,939 B2
(45) Date of Patent: Oct. 10, 2017

(54) OPTICAL RETAINING DEVICE

(71) Applicant: Robert S. Hodge, Grants Pass, OR (US)

(72) Inventor: Robert S. Hodge, Grants Pass, OR (US)

( * ) Notice: Subject to any disclaimer, the term of this patent is extended or adjusted under 35 U.S.C. 154(b) by 0 days.

(21) Appl. No.: 14/612,068

(22) Filed: Feb. 2, 2015

(65) Prior Publication Data
US 2015/0219128 A1 Aug. 6, 2015

Related U.S. Application Data

(60) Provisional application No. 61/935,218, filed on Feb. 3, 2014.

(51) Int. Cl.
*G02B 7/02* (2006.01)
*F16B 2/06* (2006.01)
*F16B 2/24* (2006.01)
*G02B 7/182* (2006.01)

(52) U.S. Cl.
CPC .............. *G02B 7/02* (2013.01); *F16B 2/065* (2013.01); *F16B 2/241* (2013.01); *G02B 7/022* (2013.01); *G02B 7/026* (2013.01); *G02B 7/182* (2013.01); *G02B 7/1825* (2013.01)

(58) Field of Classification Search
CPC .......... G02B 7/02; G02B 7/026; G02B 7/022; G02B 7/182; G02B 7/1825; F16B 2/065; F16B 2/241
USPC .......... 359/819, 822, 827, 829, 830
See application file for complete search history.

(56) References Cited

U.S. PATENT DOCUMENTS

| | | | | |
|---|---|---|---|---|
| 5,117,311 A * | 5/1992 | Nomura | .................... | G02B 7/02 359/819 |
| 5,249,082 A * | 9/1993 | Newman | ................ | G02B 7/028 359/813 |
| 5,428,482 A * | 6/1995 | Bruning | ................. | G02B 7/021 359/811 |
| 5,461,444 A * | 10/1995 | Okura | .................... | G02B 7/026 359/819 |
| 5,523,893 A * | 6/1996 | Haas | ...................... | G02B 7/028 359/818 |
| 5,680,260 A * | 10/1997 | Farcella | ................. | G02B 7/022 359/818 |
| 5,768,649 A * | 6/1998 | Pearson | ................. | G03B 19/04 359/819 |
| 6,165,393 A * | 12/2000 | Nonogaki | ............... | B29C 45/16 264/1.1 |
| 6,267,491 B1 * | 7/2001 | Parrigin | ................ | F21S 48/255 362/153 |

(Continued)

FOREIGN PATENT DOCUMENTS

FR EP 1363151 A1 * 11/2003 ............... G02B 7/02
JP 5421435 B2 * 2/2014 ............... G02B 7/02

*Primary Examiner* — Eret McNichols
(74) *Attorney, Agent, or Firm* — Chernoff, Vilhauer, McClung & Stenzel, LLP

(57) ABSTRACT

An optical mount for holding an optical element includes a mounting block having an aperture and an optical element adapted to fit within the aperture. A retaining clip is secured to the mounting block and extends across the optical element. The clip is a thin sheet of flexible material comprising contact straps that overlie edge portions of the optical element. The clip is connected to the mounting block by fasteners.

18 Claims, 3 Drawing Sheets

(56) References Cited

U.S. PATENT DOCUMENTS

| | | | | |
|---|---|---|---|---|
| 6,341,901 B1 * | 1/2002 | Iwasa | G03B 11/045 | 359/739 |
| 6,392,825 B1 * | 5/2002 | Trunz | G03F 7/70825 | 359/811 |
| 6,515,810 B1 * | 2/2003 | Melford | G02B 7/022 | 359/813 |
| 6,590,723 B1 * | 7/2003 | Hodge | G02B 7/004 | 359/822 |
| 6,624,954 B2 * | 9/2003 | Taylor | G02B 7/02 | 359/811 |
| 6,643,076 B2 * | 11/2003 | Montagu | G01N 21/6456 | 359/811 |
| 6,791,766 B2 * | 9/2004 | Nishikawa | G02B 7/022 | 353/100 |
| 6,842,299 B2 * | 1/2005 | Duon | G02B 7/02 | 359/811 |
| 6,898,026 B2 * | 5/2005 | Jewers | G02B 5/005 | 264/245 |
| 7,050,149 B2 * | 5/2006 | Owa | G03F 7/70808 | 250/492.2 |
| 7,099,090 B2 * | 8/2006 | Daikoku | G02B 7/022 | 359/719 |
| 7,158,318 B2 * | 1/2007 | Shirie | G02B 27/0018 | 359/601 |
| 7,457,059 B2 * | 11/2008 | Beck | G02B 7/023 | 359/822 |
| 7,586,697 B2 * | 9/2009 | Kuroda | G02B 7/022 | 359/649 |
| 7,990,630 B2 * | 8/2011 | Storch | G02B 7/022 | 359/811 |
| 8,250,723 B2 * | 8/2012 | Kasha | G02B 7/022 | 29/407.09 |
| 8,284,506 B2 * | 10/2012 | Ashcraft | G01M 11/04 | 359/819 |
| 8,498,067 B2 * | 7/2013 | Arai | G02B 7/02 | 359/811 |
| 9,168,620 B2 * | 10/2015 | Wang | B23P 19/04 | |
| 2003/0043728 A1 * | 3/2003 | Kan | B29C 65/08 | 720/681 |
| 2007/0177281 A1 * | 8/2007 | Darmes | G02B 3/00 | 359/811 |
| 2012/0105739 A1 * | 5/2012 | Shimizu | F21V 5/04 | 348/790 |
| 2014/0233116 A1 * | 8/2014 | Hara | G02B 7/02 | 359/819 |
| 2015/0264231 A1 * | 9/2015 | Murayama | G02B 7/02 | 348/308 |
| 2015/0301303 A1 * | 10/2015 | Kim | G02B 7/021 | 348/373 |

* cited by examiner

OPTICAL RETAINING DEVICE

CROSS-REFERENCE TO RELATED APPLICATIONS

This application claims the benefit of U.S. provisional application ser. no. 61/935,218 filed Feb. 3, 2014.

BACKGROUND OF THE INVENTION

The following invention relates to a mount for an optical element. In laser systems, which are precision tools used in the manufacture of microelectronics, medical devices, and laboratory instruments, all optical elements must be free from alignment and distortion errors. Lasers, in these manufacturing applications, may be used to drill small holes or cut difficult-to-machine glass. Accuracy is important and the avoidance of positioning errors is a design goal. Such errors may be caused by shock, vibration, or heat and may cause an optical element in the path of a precision laser to wander. In addition, the various optical components in a system are conventionally caused to slip out of position from time to time. Beam wander degrades system alignment, seen often as a drop in power, an increase in spot size, or other physical displacement of a focused spot, causing down time and necessitating repairs.

A component in an optical system that may affect performance is the optical mount. Mounts must provide long term pointing stability for optical components, especially in the presence of ambient temperature variations, mechanical shock, and vibration.

Typically, optical components are held in an optical mount that comprises a block having an aperture shaped and dimensioned to hold an optical element, such as a lens or a mirror. To hold the element in place, screws are typically used which come through the block and engage the element from the side, applying pressure at the edges. However, precision systems call for very accurate optical element surfaces, typically of quarter-wave surface accuracy or better. The pressure from retaining screws can cause surface distortion, warping an optical component out of shape.

Thus, a desirable object in an optical mount is a means for maintaining the element in proper alignment without causing surface distortion.

BRIEF DESCRIPTION OF THE SEVERAL DRAWINGS

DETAILED DESCRIPTION OF PREFERRED EMBODIMENTS

An optical mount has an aperture for receiving an optical element. The mount holds the optical element in place so that positioning of the mount is all that is necessary to properly align the optical element in the system of desired use, such as a laser system. Typically, the top surface of the optical element is in a plane that is above the top surface of the mount. A retaining clip made from a sheet of a flexible material such as a thin metal overlies the top of the optical element and is fastened to the mounting block by bolts spaced 180 degrees apart. The retaining clip has a large central cut out leaving thin portions of material that contact the optical element along its edges, just enough to hold it in the mounting block. The remainder of the optical element is uncovered.

Figure 1:
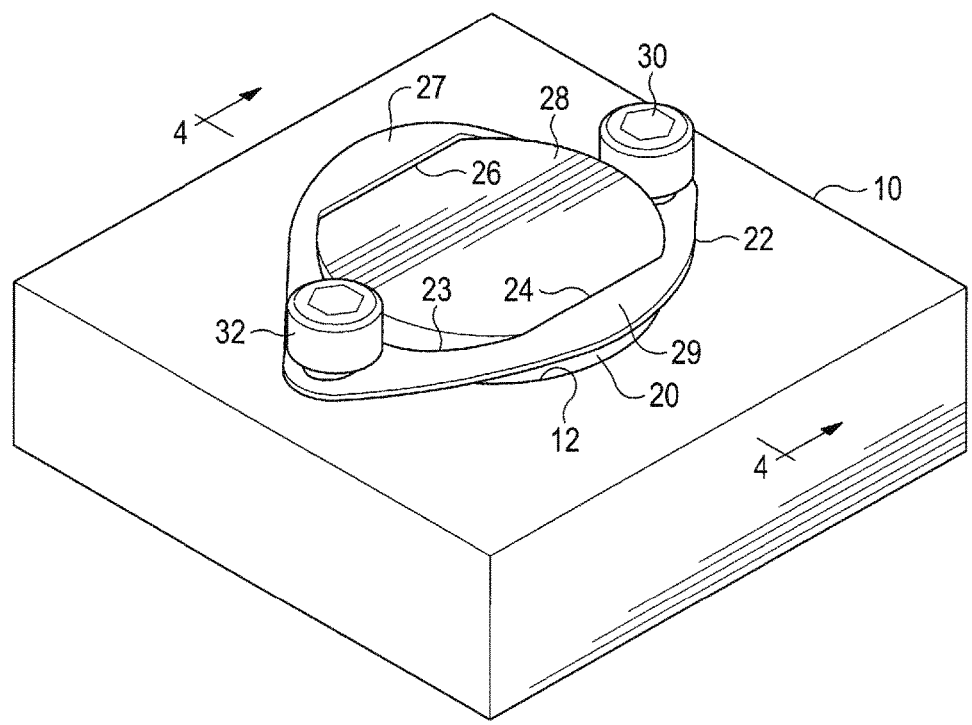
FIG. 1 is a perspective view of an optical mount with a secured optical element.

In FIG. 1, a mount 10 is a block of material with an aperture 12 and threaded holes 14, 16. The block 10 may be placed in any optical system that requires an aligned optical element. An optical element 20 which may be, for example a lens or a mirror is placed in the aperture 12 which is sized to receive it with a close fit. Typically, such optical elements are cylindrically shaped and thus the apertures are circular.

Figure 2:
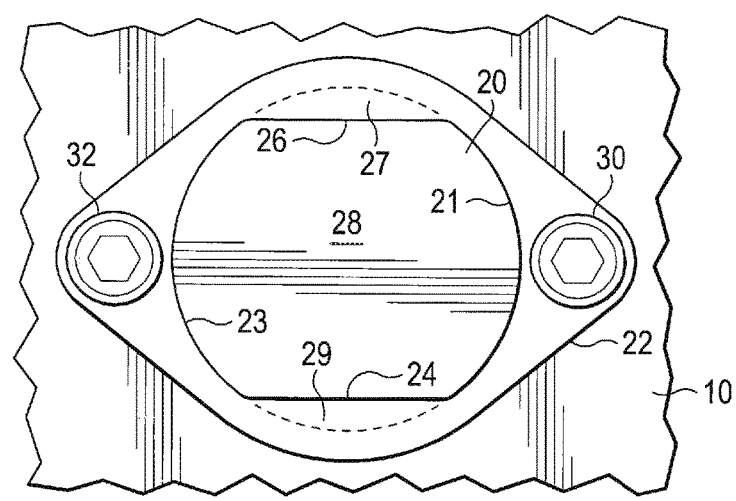
FIG. 2 is a partial top view of the optical mount of FIG. 1.

The optical element 20 is held in place by a flexible or bendable retaining clip 22 that is adapted to fit over the top of the optical element 20. The clip 22 is a band or sheet of material with an interior portion removed, leaving a modified oval cut out with straight sides 24, 26 connecting round end portions 21, 23. The straight sides of the cut out form contact straps 27, 29 that bear against peripheral portions of the top surface 28 of the optical element 20. This is shown best by the dashed outline in FIG. 2 showing the opposing edge portions 24, 26 of the clip covering the top surface 28 of the optical element 20 because the distance between the edges 24, 26 is less than the diameter of the optical element 20.

Figure 3:
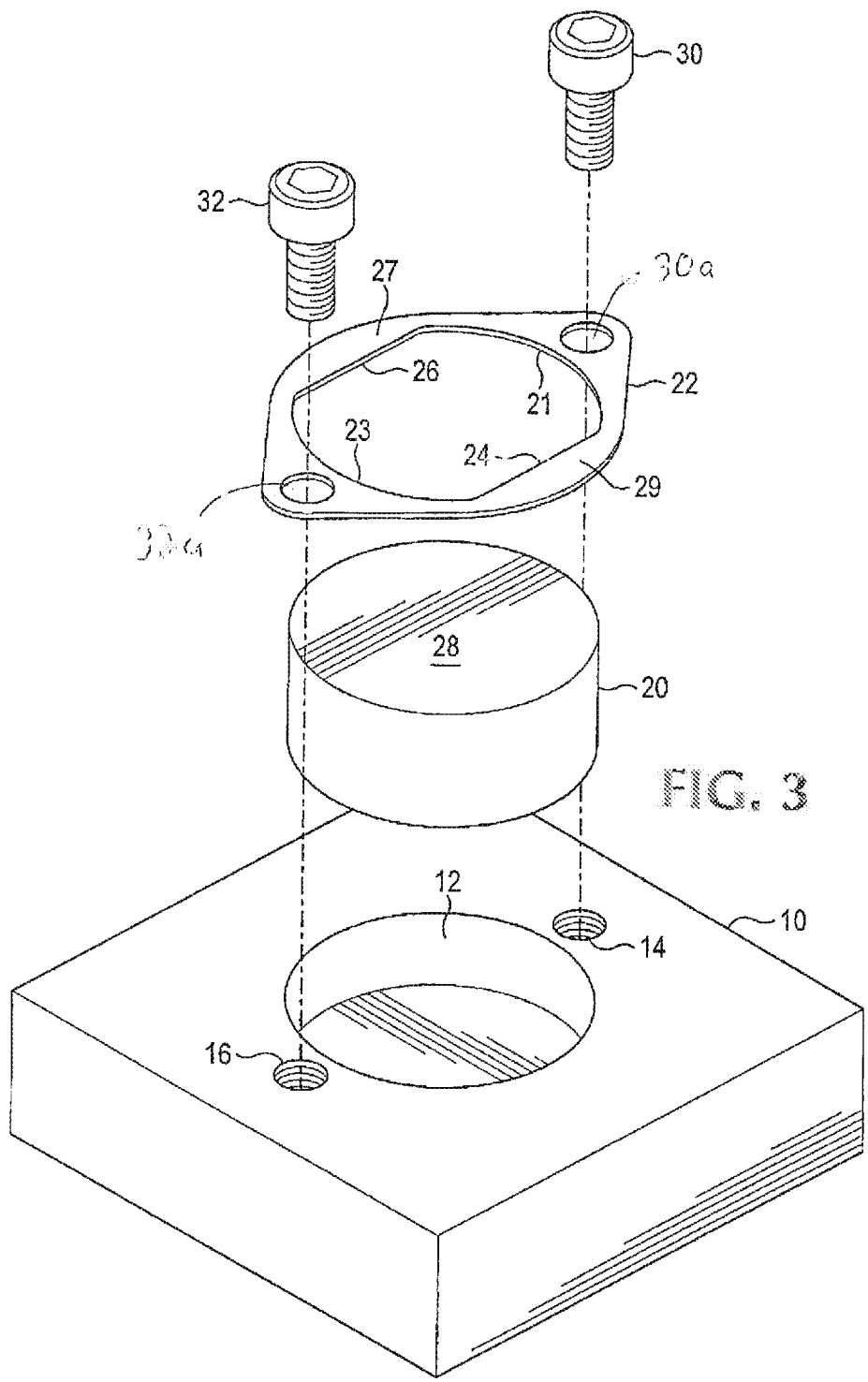
FIG. 3 is an exploded view in perspective of the optical mount and element of FIG. 1.

The clip is fastened to the mounting block 10 by bolts 30, 32 which engage the holes 14, 16 through apertures 30a and 32a in the clip, as seen in FIG 3. When the bolts 30, 32 are tightened, the clip 22, which may be made of a flexible and bendable material, flexes so that the optical element 20 is held in the aperture 12 by the spring-like action of the material. This retains the optical element 20 in the mount 10 securely enough for proper alignment without introducing mechanical stress that could otherwise cause distortion.

The straight sides of the cut out in the clip 22 in essence form thin contact portions or straps 27, 29 secured at either end by the bolts 30, 32. Since these straps 27, 29 stretch lengthwise parallel across the optical element and equidistant between the bolts, and the bolts are 180 degrees apart, a symmetrical retaining force is provided that holds the optical element in place evenly, that is the retaining forces are equal on both sides of the optical element. This holds the optical element in place without skewing it.

Figure 4:
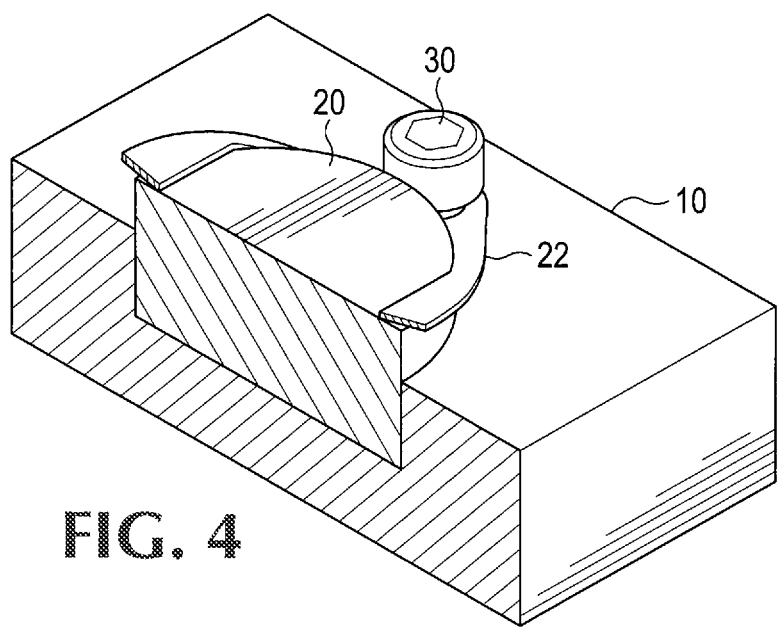
FIG. 4 is a perspective cut away view of an optical mount for a mirror, taken along line 4-4 of FIG. 1.

In FIG. 4, the optical element 20 is a mirror. Thus, the mounting block 10 has an aperture12 which is a cylindrical well journalled out of the body of the mounting block.

Figure 5:
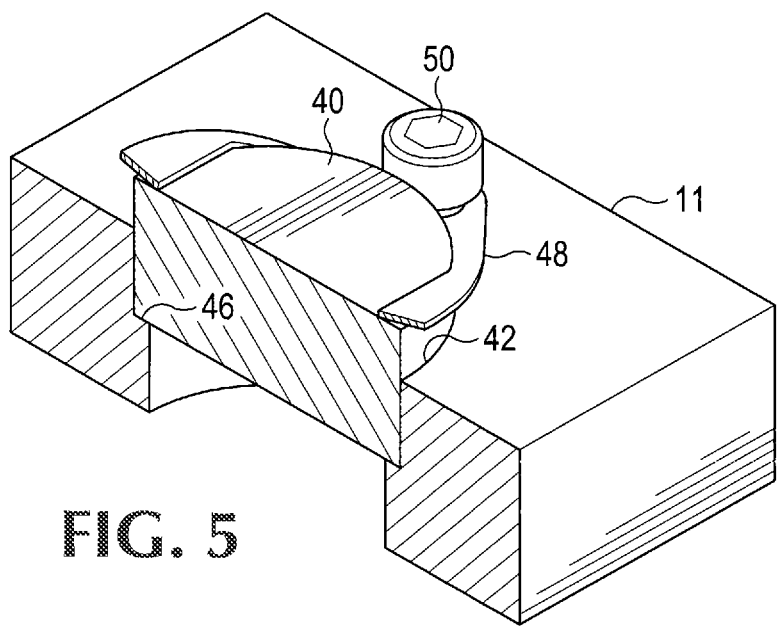
FIG. 5 is a perspective cut away view of an optical mount for a lens.

In FIG. 5, the optical element is a lens 40 that fits within an aperture 42. The aperture 42 extends all the way through the mounting block 11. At a distance below its top surface and within the body of the mounting block 11, there is a circular ledge or flange 46 that supports the lens 40. A retaining clip 48 similar in all respects to the retaining clip 22 secures the lens 40 to the flange 46. The clip 48 is held in place by a bolt 50. It is understood that an identical bolt secures the other side of the clip to the mounting block 11 (not shown).

The clip 22 or clip 48 may have various other geometries without compromising its essential function. All that is required is that the clip have thin portions that constitute retaining straps or overlays along the top of the optical element, enough to hold it in place, either in the well of the mounting block or secured against a flange or ledge in the mounting block. To that end the interior cut out part of the clip could be circular or hexagonal or any other geometric shape as long as at least part of the interior cut out portion has a diameter less than the diameter of the optical element. Preferably, the portions of the clip that overlie the surface of the optical element are symmetrical. In addition, more than two bolts may be used if desired.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. An apparatus comprising:
   (a) a mounting block having an aperture,
   (b) an optical element adapted to fit within said aperture,
   (c) a retaining clip secured to the mounting block by first and second fasteners each adjustable to apply a variable force on the optical element by the retaining clip, the clip defining an annular ring having a circumference and an axial length that extends between the first and second fasteners, the clip comprising elongate first and second contact straps each along the circumference and that overlie respective edge portions of the optical element, the elongate contact straps having a length laterally offset from, and parallel with the axial length of the annular ring, where
   (d) adjustment of each fastener evenly distributes the variably applied force between the first and second contact straps.

2. The optical mount of claim 1 wherein the retaining clip is made of a flexible material.

3. The optical mount of claim 2 wherein the flexible material is a metal.

4. The optical mount of claim 1 wherein the retaining clip is a thin sheet of flexible material having a central cut out region, said cut out region having a diameter slightly smaller than a diameter of said optical element.

5. The optical mount of claim 4 wherein said cut out region includes substantially oval end portions adjacent the fasteners and substantially straight parallel side portions comprising said contact straps.

6. An apparatus comprising:
   (a) a mounting block having an aperture,
   (b) an optical element adapted to fit within said aperture,
   (c) a retaining clip secured to the mounting block by first and second fasteners spaced 180 degrees apart from each other, and each adjustable to apply a variable force on the optical element by the retaining clip, the clip comprising a thin flexible sheet comprising first and second contact straps adapted to bear against a top surface of said optical element near a peripheral edge of the optical element and opposite each other, to retain the optical element within said aperture, where
   (d) adjustment of each fastener evenly distributes the variably applied force between the first and second contact straps.

7. The optical mount of claim 6 wherein said contact straps each have inner straight edges parallel to each other.

8. The optical mount of claim 7 wherein said inner straight edges are spaced equidistant from said bolts.

9. The optical mount of claim 6 wherein the optical element is a mirror and the aperture is a hollow well in the mounting block.

10. The optical mount of claim 6 wherein the optical element is a lens and the aperture extends through the mounting block.

11. The optical mount of claim 10 wherein the aperture has a flange for supporting the lens in the mounting block.

12. An optical mount for supporting an optical element having an axial length through the center of the optical element, the optical mount comprising:
    (a) a mounting block and first and second fastening elements arranged on the mounting block a linear distance from each other, the optical mount capable of supporting the optical element so that the axial length of the optical element overlays, and spans a majority of, the linear distance between the first and second fastening elements,
    (b) a retaining clip having third and fourth fastening elements that, when the retaining clip retains the optical element against the mounting block such that said first and second fastening elements spatially overlap said third and fourth fastening elements, respectively, the retaining clip secures the optical element to the mounting block via opposing straps each extending laterally from said third and fourth fastening elements to form an annular ring having opposed contact faces that each applies a retaining force to an upper surface of the optical element proximate a respective outer edge normal to the upper surface of the optical element, the retaining force caused by the retaining clip flexing at the third and fourth fastening elements.

13. The optical mount of claim 12 wherein the fastening elements receive bolts.

14. The optical mount of claim 13 wherein the straps each have inner straight edges parallel to each other.

15. The optical mount of claim 14 wherein said inner straight edges are spaced equidistant from said bolts.

16. The optical mount of claim 12 wherein the mounting block defines a hollow well to receive the optical element.

17. The optical mount of claim 12 wherein the mounting block defines an aperture that extends through the mounting block and capable of receiving the optical element.

18. The optical mount of claim 17 wherein the aperture has a flange for supporting the optical element.

* * * * *